United States Patent [19]

Vance et al.

[11] Patent Number: 4,525,835

[45] Date of Patent: Jun. 25, 1985

[54] DUPLEX RADIO SYSTEM UTILIZING TIME COMPRESSION EXPANSION

[75] Inventors: Ian A. W. Vance, Newport, England; Stephen D. Bainton, Ottawa, both of Canada

[73] Assignee: International Standard Electric Corporation, New York, N.Y.

[21] Appl. No.: 433,079

[22] Filed: Oct. 6, 1982

[30] Foreign Application Priority Data

Oct. 13, 1981 [GB] United Kingdom ............... 8130812

[51] Int. Cl.³ .................... H04L 5/14; H04B 1/56; H04J 3/00
[52] U.S. Cl. ........................................ 370/29; 455/86
[58] Field of Search ............... 370/24, 29, 109, 38, 370/39; 381/34, 35; 179/2 EA; 455/72, 85, 324, 86

[56] References Cited

U.S. PATENT DOCUMENTS

| | | | |
|---|---|---|---|
| 2,056,031 | 9/1936 | Wright | 455/324 |
| 2,948,808 | 8/1960 | Neumann et al. | 455/85 |
| 3,573,379 | 4/1971 | Schmitz et al. | 455/85 |
| 3,636,524 | 1/1972 | Holland | 370/109 |
| 3,827,052 | 7/1974 | Tanaka | 370/29 |
| 4,034,295 | 7/1977 | Kotezawa et al. | 370/29 |
| 4,349,919 | 9/1982 | Richardson | 455/86 |

FOREIGN PATENT DOCUMENTS

| | | |
|---|---|---|
| 0016336 | 10/1980 | European Pat. Off. . |
| 1474726 | 5/1977 | United Kingdom . |
| 1479313 | 7/1977 | United Kingdom . |
| 1486547 | 9/1977 | United Kingdom . |
| 1556087 | 11/1979 | United Kingdom . |
| 2064921 | 6/1981 | United Kingdom . |

OTHER PUBLICATIONS

"A Direct Conversion Receiver for 3.5 MHz", by I. Pogson, Electronics Australia, vol. 38, No. 9, Dec. 1976.
"Time-Compression Multiplexing: Squeezing Digits Through Loops", by B. S. Bosik, AT&T Bell Laboratories Record, Feb. 1984.

Primary Examiner—Douglas W. Olms
Assistant Examiner—Kenneth I. Rokoff
Attorney, Agent, or Firm—John T. O'Halloran; Peter R. Ruzek

[57] ABSTRACT

A multichannel duplex radio system for cordless telephone in which digital information is sent between the two ends. The data is divided into blocks which are transmitted in a fraction of the original block length. The other time slots are used for the duplex return path and for other similar equipment operating nearby. A direct conversion radio receiver is used in which the local oscillator signal is modulated for transmission.

9 Claims, 7 Drawing Figures

DUPLEX RADIO SYSTEM UTILIZING TIME COMPRESSION EXPANSION

BACKGROUND OF THE INVENTION

The present invention relates to a multichannel duplex radio system, typically in the form of portable radio transmitter/receiver equipments such as cordless telephones.

A single channel duplex communication system is known, for example, from British Pat. No. 1,556,087.

In such a system the receiver portion makes use of a so-called "zero IF" or "direct conversion" method of demodulation. Such a method is descirbed in Bristish Pat. No. 1,530,602 and our co-pending British Application No. 8,128,956. Briefly, local oscillator signals in phase quadrature at the carrier frequency are each separately mixed with the incoming audio modulated signal. The resulting signals have zero IF with the two sidebands folded over on each other at the baseband and extending in frequency from DC to the single sideband width of the original signal. The mixer outputs are low pass filtered and then amplified to a standard level. After amplification the two signals are separately differentiated. Each differentiated signal is then multiplied by the input to the other differentiator and one of the multiplier outputs is subtracted from the other.

A system for a full duplex single channel radio transmitter/receiver is disclosed in British Patent Application No. 8,027,566. The "zero IF" or "direct conversion" method of demodulation is again used, but the radio signals are transmitted in digital form.

The transmission is effected by way of frequency shift keyed (FSK) digital signals, the transmitter portion including a source of digital signals and a local oscillator capable of being modulated by the digital signal to produce FSK signals. The local oscillator FSK signals are coupled to a transmission medium. The FSK signals received from the transmission medium are mixed with the local oscillator output to produce quadrature output signals, and a zero IF demodulator to which the quadrature outputs are applied produces a digital output which signal is delayed and applied to a digital network wherein cancellation with corresponding digital signals from a splitter/combiner network is effected.

SUMMARY OF THE INVENTION

An object of the present invention is to provide a number of full duplex radio communication channels each using the same portion of the frequency spectrum.

A feature of the present invention is the provision of a duplex radio system having a plurality of terminals, each of the plurality of terminals comprising a direct conversion receiver having a local oscillator; compression means for time compressing data to be transmitted coupled to the oscillator; expansion means for time expandng data received coupled to the receiver; and control means coupled to the compression means and the expansion means to control modulation of the oscillator and hence transmission of the time compressed data to be transmitted and expansion of the received data.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
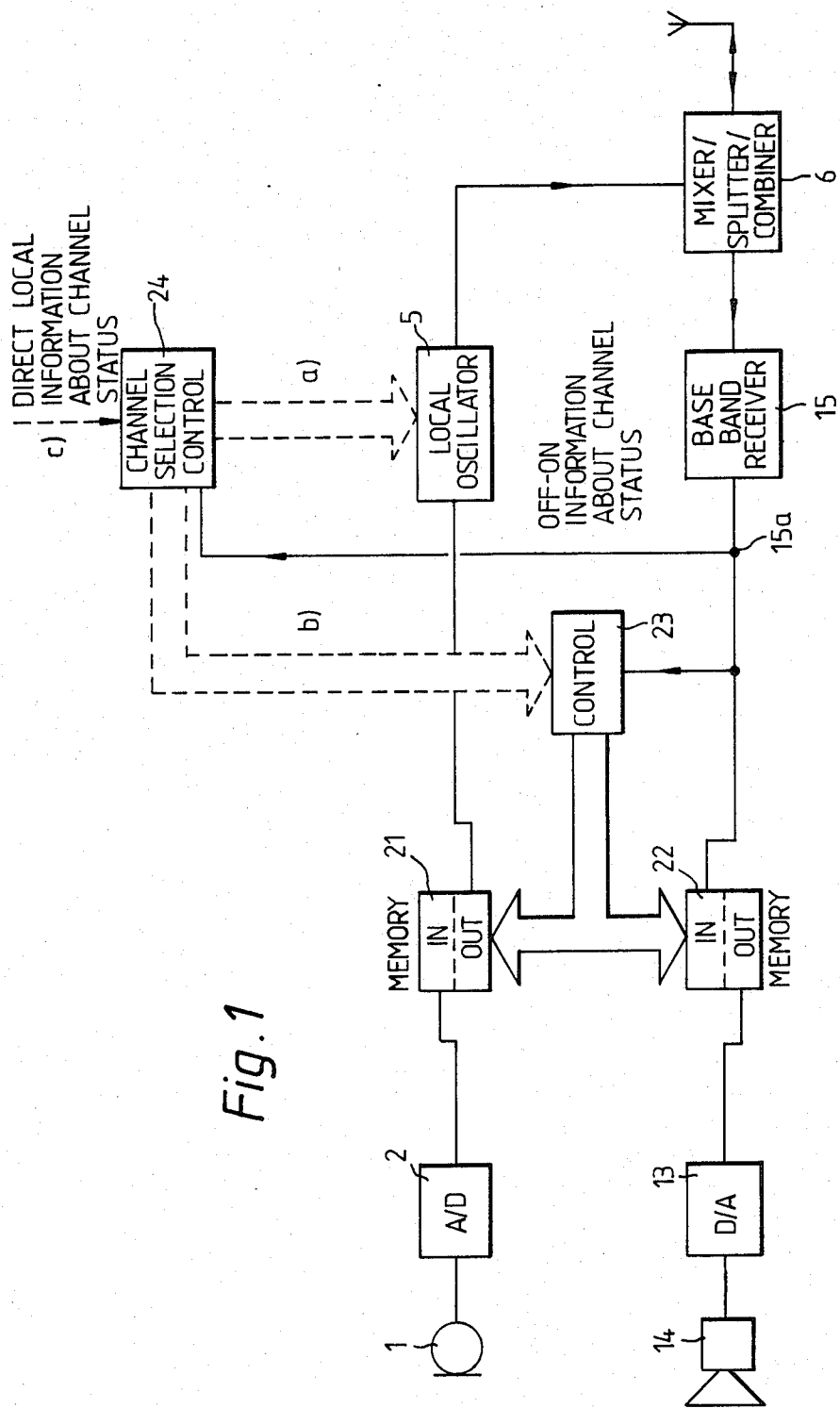
FIG. 1 is a block diagram of one terminal of a multichannel system in accordance with the principles of the present invention.

Referring to FIG. 1, the analog output of microphone 1 is passed via analog to digital converter 2 for storage in digital memory 21. When a time slot is available, the stored information in memory 21 is read out as a burst of data and passes via oscillator 5 and mixer/splitter/combiner 6 for transmission.

On the receive side, an incoming information burst passes via direct conversion (zero IF) receiver 15 to memory 22 and is read out from memory 22 and passes via digital to analog converter 13 to transducer 14.

Control blocks 23 and 24 determine when data can be transmitted dependent on information on other channels received either directly or off-air.

Either end of the link assumes "master" status depending upon the originating direction of the call. The oscillator 5 is nominally in the center of the operating band and for the receive mode is unmodulated. For the transmit burst the oscillator 5 is modulated and either transmitted directly or swtiched to the antenna. Any form of modulation may be used. The control blaocks 23 and 24 monitor the state of the wideband channel so as to decide which time slot is most appropriate for communicating. Dynamic channeling (trunking) is thus obtained without the need for a frequency synthesizer. In a typical application digitized voice would be sent over the duplex channel and the control function would include facilities for signaling and supervision of the line, e.g. call set up and clear down. The control function also continuously monitors the state of the transmission so as to move the time slot being used and maintain the required quality of transmission. This is necessary in the system as described since other users have asynchronous clocks and thus drift relative to the time slots of the link considered. The local oscillator 5 may contain a surface acoustic wave device.

Thus, the system provides a number of full duplex radio communication channels each using the same portion of frequency spectrum. Each duplex channel operates independently of the others and there is no fixed master control of the system. By using a direct conversion (zero IF) radio receiver in each equipment its local oscillator can be used as the tranmitter as well. The information to be transmitted is broken down into blocks of data which are compressed in time and sent as bursts of data in each direction so as to occupy a fraction of their original block length. In the intervals between the bursts other transmitter/receiver combinations communicate which are operating nearby.

The use of a direct conversion receiver together with time duplex and time multiplex gives a simple single channel/multichannel availablility duplex radio link without the need for a separate transmitter and RF duplexing arrangements.

The control comprises two sections. Control section 23 performs the mechanical function of clocking data into and out of the memories 21 and 22 at the correct rate and time. If the terminal is acting as a slave, then control section 23 will also monitor incoming "raw" data from the receiver 15 in order that it can ensure that the transmitted data is synchronized.

The multiplex facility is provided by the more intelligent channel selection control section 24. Depending on whether FDM or TDM is being used, control section 24 either controls the local oscillator frequency or assigns the time slots to be used by control section 23 through connection a or b, respectively.

Control section 24 receives and decodes "off-air" information about the status of the channels in the system and uses this to assign its present one.

In the case of a "central" system, e.g. a central transmit/receive unit in a cellular mobile radio system where many channels may be in use at the same location, the control section 24 would be arranged to receive channel information direct (connection c). Thus, the central transmit/receive unit is adapted to provide communication with a number of remote units. In this case the central unit will assign the channels as required to the individual duplex equipments.

The receiver utilized in the present system does not process signals that consist simulatneously of components of both transmitted and received waveform since the receive and transmit functions are time-multiplexed. For this reason the zero IF receiver need not necessarily be one that demodulates FM, although preferably it is.

Figure 2:
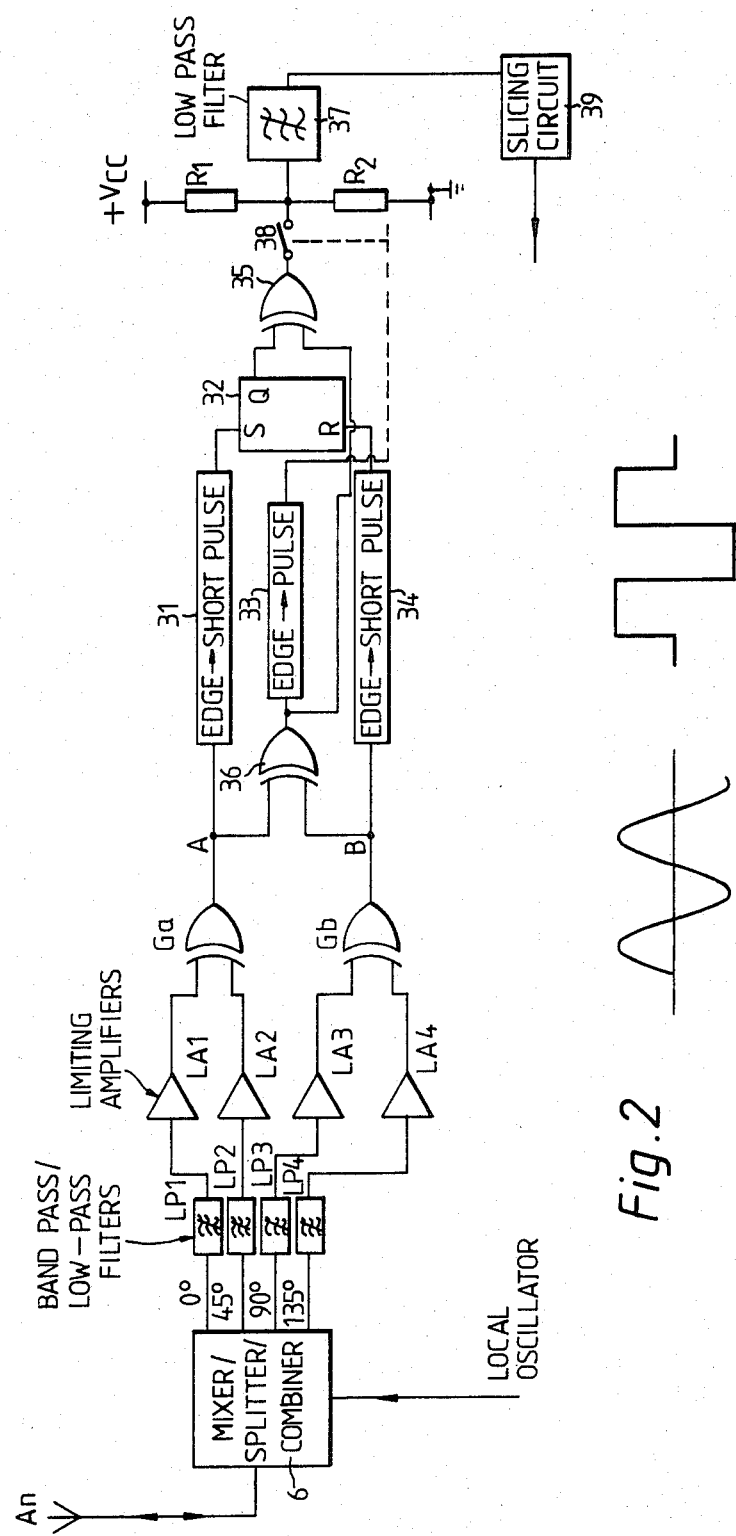
FIG. 2 is a block diagram of one form of baseband receiver suitable as the receiver 15 of FIG. 1.

An embodiment of a receiver 15 is shown in FIG. 2. Referring to FIG. 2, the baseband receiver shown includes the mixer/splitter/combiner circuit 6 which receives the signals from the antenna An and from the local oscillator 5 to mix the signals down to baseband and provides four channels spaced at 45 degree intervals. This is because the modulation index used would probably be 0.707. The circuit 6 also has a switch to load all the local oscillator power to the antenna for transmission and prevent this leakage during reception.

The signals in the four channels are fed via respective low pass filters LP1, LP2, LP3, LP4 to respective limiting amplifiers LA1, LA2, LA3, LA4. The four channels are then combined back into two channels A and B in quadrature using two EXCLUSIVE-OR gates Ga and Gb.

The outputs of channels A and B are applied to an EXCLUSIVE-OR gate 36 which provides a square wave output at twice the deviation frequency. Blocks 31 and 34 will, in response to every edge in channel A or B, respectively, produce a short pulse which sets or resets a flip-flop 32. A longer pulse (of the length required for output) is produced by block 33 which closes an analog switch 38 for the duration of the pulse. Blocks 31, 33, 34 could be realized by an EXCLUSIVE-OR gate and a resistor and a capacitor, for example, but the man skilled in the art will realize alternative arrangements depending on the application. In general terms blocks 31, 33, 34 can be described as monostables triggerable by either positive or negative-going pulses. The output pulse of block 33 has a polarity determined by the EXCLUSIVE-OR gate 36 and EXCLUSIVE-OR gate 35 through flip-flop 32. This output pulse is applied to the junction between two resistors of equal value $R_1$ and $R_2$ so that the polarity of the pulse at this junction is either 0 volts when the signal at the output of block 33 is a logical "0" and the switch 38 is closed or $V_{cc}$ when the signal at the output of block 33 is a logical "1" and the switch 38 is closed. Thus, the waveform shows whether the incoming rf signal is above or below the local oscillator frequency, and this is multiplied by the series of pulses of waveform at c since waveform c changes its polarity at each edge (both positive and negative) of the deviation frequency. When the analog gate 38 is open, the junction between resistors $R_1$ and $R_2$ is at $\frac{1}{2} V_{cc}$.

Low-pass or band-pass filter 37 produces an approximation of an analog output.

The analog output h is fed to a slicing circuit 39 which slices the output so that above a threshold voltage the circuit produces a logic 1 and anything below it produces a logic 0.

The output of the slicing circuit 39 is the output 15a of the baseband receiver 15 shown in FIG. 1.

Figure 3:
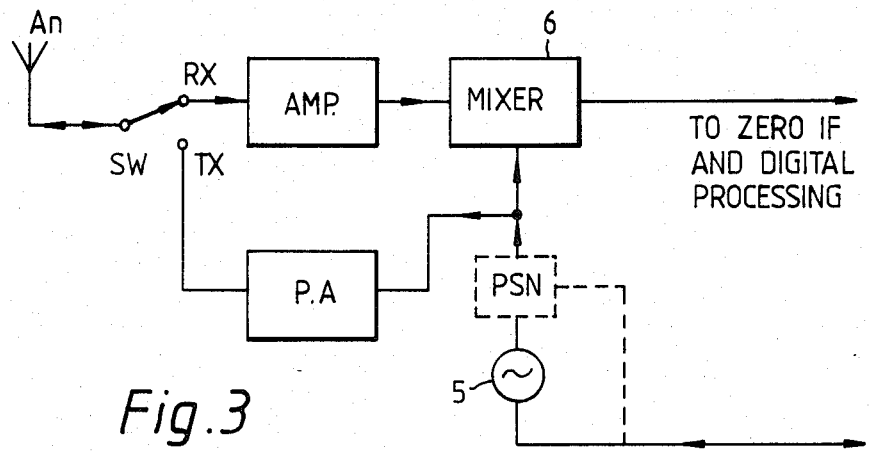
FIG. 3 is a block diagram of one form of mixer/splitter/combiner 6 of FIG. 1.

One form of circuit 6 in FIG. 1 is shown in FIG. 3. Switch SW switches between receive and transmit modes to feed a pre-mixer RF amplifier AMP for reception and to transmit the oscillator modulation signal via a power amplifier PA for transmission. As an alternative to the direct modulation of the oscillator 5, the modulation can be applied to an electrically controllable phase shift network PSN interposed between the local oscillator 5 and the antenna An.

The function of memory 21 in FIG. 1 is to continuously clock in data at the lower bit rate from A/D converter 2, and at times specified by control 23 to clock out the same data in blocks at a higher data-rate.

Memory 22 performs the reverse function by continuously clocking data out at a low bit rate into D/A converter 13 that has been clocked into it in bursts at a higher bit rate.

Figure 4:
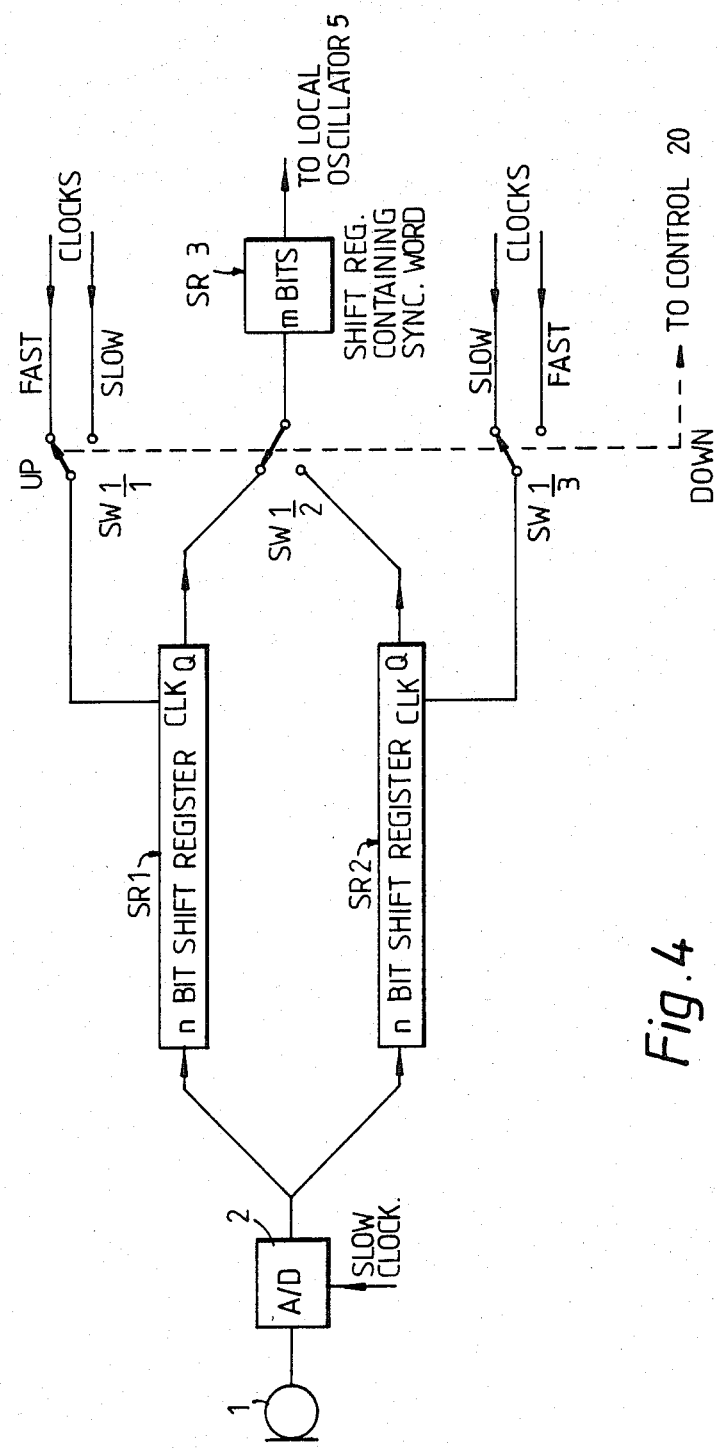
FIG. 4 is a block diagram of one form of memory 21 of FIG. 1.

Provision can be made in memory 21 for adding a sync word to the data blocks before they are released, and in memory 22 for extracting a sync word from the fast input data so that it does not get clocked into the D/A converter 19. FIG. 4 shows one form of such a memory. Data is continuously clocked into shift registers SR1 and SR2, but they are clocked at different rates. Thus, if switch SW1 is in the "UP" position then shift register SR1 is clocked at the fast (Output) rate and shift register SR2 is clocking in data at the slow rate from A/D converter 2. As soon as shift register SR2 is full SW1 is moved to the "DOWN" position, and the stored data is clocked fast, at the correct time, through SR3 which is preloaded with the sync word (should this be required). Meanwhile, shift register SR1 has been carrying on loading the data at the slow rate. Thus, while the previous data is being clocked out fast, new, meaningless data is being clocked in from the A/D converter 2. This does not matter, however, since as soon as the valid data bits have been output, a shift register SR3 is switched over to the other shift register ready to accept some new and valid data.

The total length of the transmitted burst is "n+m" bits (m=sync word length) and the time that it must be transmitted in is n/2pr where "r" is the A/D bit rate and "p" is the number of TDM channels in a TDM system.

The transmitted bit rate is therefore $$\frac{2pr(n+m)}{n}$$

It should also be noted that the fast clock is in general not continuous but consists of bursts of (n+m) pulses.

Figure 5:
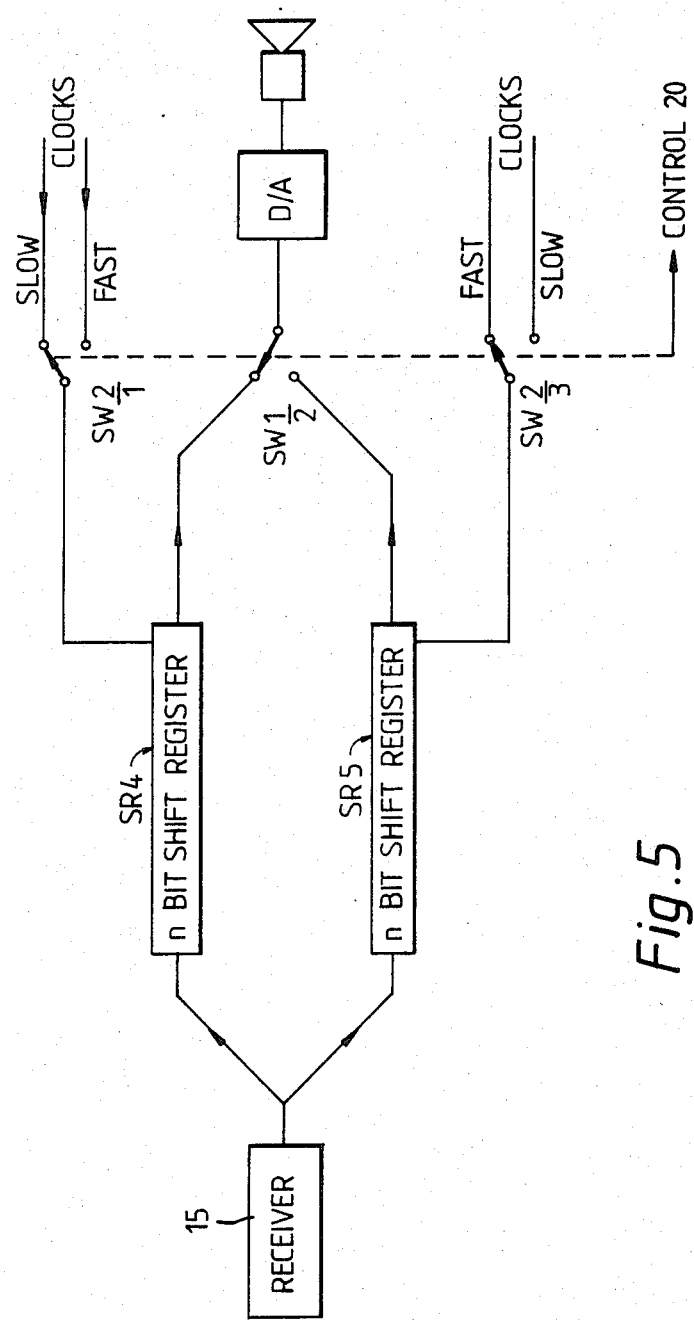
FIG. 5 is a block diagram of one form of memory 22 of FIG. 1.

FIG. 5 shows a similar format for the receive memory 22 where n bits are clocked into a shift register SR4 at the correct time. The n bits are then clocked slowly into the D/A converter 13 while the other shift register SR5 stands by to receive its burst from the receiver 15. Switch SW2 is controlled in a way similar to SW1 in FIG. 4.

Figure 6:
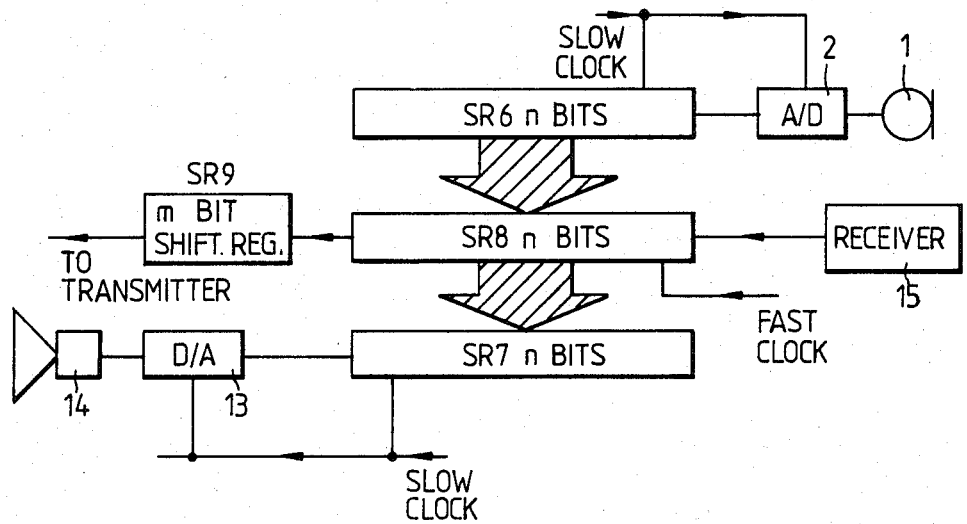
FIG. 6 is a block diagram of an alternative form of memory 21 or 22 of FIG. 1.

FIG. 6 shows another method of realizing the memories 21 and 22 which is conservative of storage, but requires a parallel loading facility.

Shift registers SR6 and SR7 are continuously clocked synchronously with the A/D and D/A converters 2 and 13, respectively, shift register SR 8 is then clocked at the correct times (a) to load data from the receiver, and (b) to pass data to the transmitter. After (a) has occurred, shift register SR7 is parallel loaded from shift register SR8, maintaining a continuous valid stream of data to the D/A converter 13. Shift register SR8 is then ready to parallel load from shift register SR6 before sending its block of data through shift register SR9 to the transmitter. Shift register SR9 is pre-loaded with the sync word at the same time as shift register SR7 is loaded.

Figure 7:
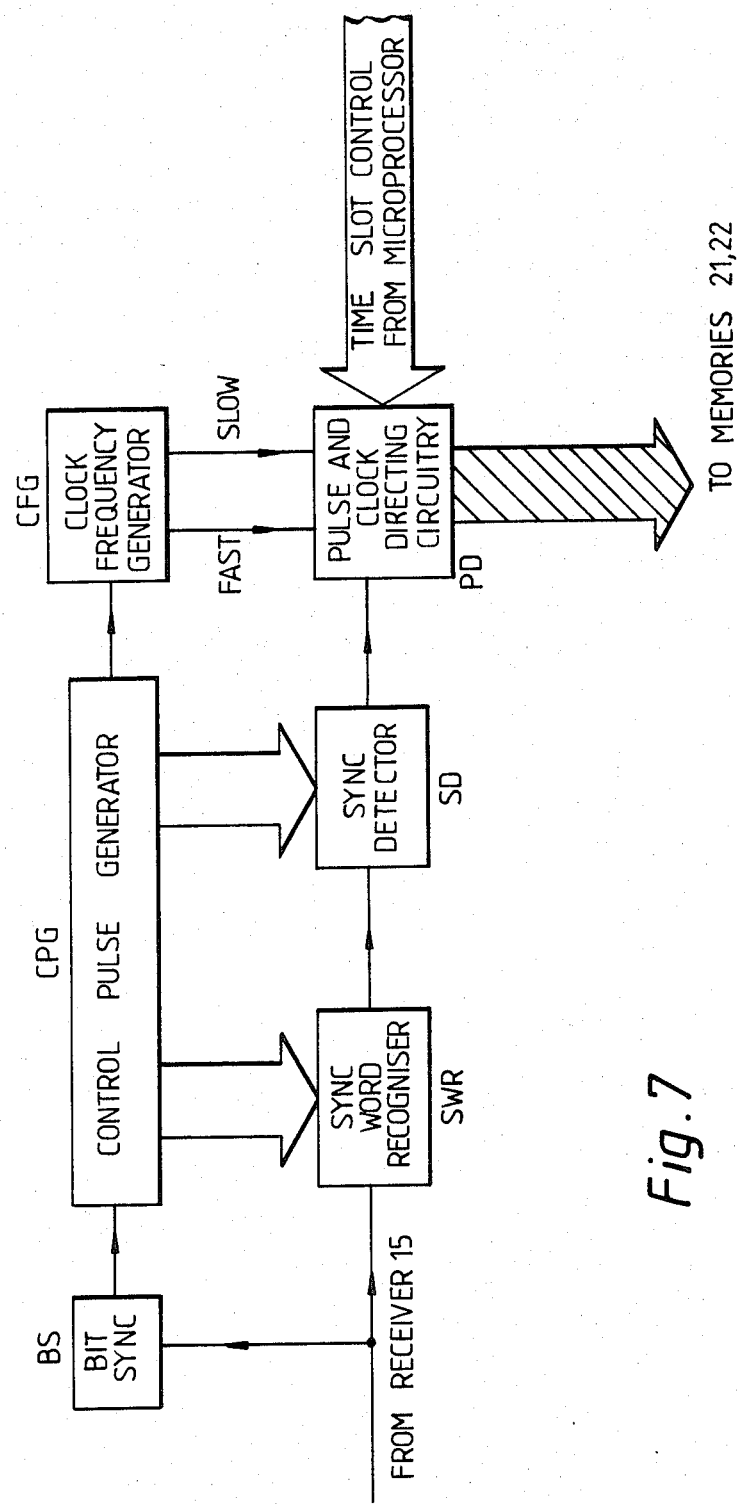
FIG. 7 is a block diagram of one form of the controls 23 and 24 of FIG. 1.

FIG. 7 shows the main circuit blocks for the controls 23 and 24. This is for the slave terminal. A master would not have bit sync or sync recognizer, but would generate pulses to load sync words into the transmitter memory.

The pulse and clock directing circuitry is a set of logic switches arranged to control the memories in the correct fashion operating from the information gained from the sync detector and microprocessor bus.

A bit synchronism device BS feeds a control pulse generator CPG which provides control pulses to a sync word recognizer SWR and sync detector SD. A clock frequency generator CFG provides fast and slow clock frequencies to a pulse and clock directing circuit PD. Circuit PD comprises a set of logic switches arranged to control the memories 21 and 22 in the correct fashion and operating from the information gained from the sync detector SD and a microprocessor bus forming part of control 24.

While we have described above the principles of our invention in connection with specific apparatus, it is to be clearly understood that this description is made only by way of example and not as a limitation to the scope of our invention as set forth in the objects thereof and in the accompanying claims.

We claim:

1. A duplex radio system having a plurality of terminals each operative for transmitting outgoing signals and receiving incoming signals on any of a plurality of transmission channels which can thus have a used or unused status, each of said plurality of terminals comprising:
   a direct conversion receiver having a receiver input that has the incoming signals coupled thereto during operation in a receive mode, and a receiver output;
   local oscillator means having a control input and an oscillator output and operative for generating and presenting at said oscillator output an output signal at a carrier frequency modulated with any modulating signal supplied to said control input, said oscillator output being coupled to said receiver input to supply thereto at least during operation in said receive mode the output signal of said oscillator means at said carrier frequency;
   compression means for time compressing data, including an output connected to said control input of said oscillator means to supply the time compressed data to said control input as said modulating signal;
   expansion means for time expanding data received, including an input coupled to said receiver output; and
   control means having outputs coupled to said compression means and said expansion means to control modulating of said oscillator means with said modulating signal and hence transmission of said time compressed data to be transmitted during a transmit mode of operation, and expansion of said received data during the receive mode of operation.

2. A system according to claim 1, wherein
said compression means includes
   a first digital memory to receive and store generated data at a first rate and to produce said data to be transmitted at a second rate faster than said first rate so that said data to be transmitted is a burst of data.

3. A system according to claim 2, wherein
said expansion means includes
   a second digital memory to receive and store said burst of data at a third rate and to produce said expanded received data at a fourth rate slower than said third rate.

4. A system according to claim 1, wherein
said expansion means includes
   a digital memory to store said received data at a first rate and to produce said expanded received data at a second rate slower than said first rate.

5. A system according to claims 1, 2, 3 or 4, further including
   switching means coupled to an antenna, said receiver and said oscillator means being controlled by said control means in synchronization with said compression means and said expansion means to couple said oscillator means to said antenna during operation of said comression means and to couple said receiver to said antenna during operation of said expansion means.

6. A system according to claim 5, wherein
said control means is coupled to said receiver output and includes means for deriving channel status information from the output signal of said receiver.

7. A system according to claim 5,
further comprising means for inputting channel status information to said control means locally.

8. A system according to claims 1, 2, 3 or 4, wherein
said control means is coupled to said receiver output and includes means for deriving channel status information from the output signal of said receiver.

9. A system according to claims 1, 2, 3 or 4,
further comprising means for inputting channel status information to said control means locally.

* * * * *